US011349806B2

(12) United States Patent
Atanasov (10) Patent No.: US 11,349,806 B2
(45) Date of Patent: May 31, 2022

(54) METHODS, APPARATUSES AND SYSTEMS FOR ASSIGNING IP ADDRESSES IN A VIRTUALIZED ENVIRONMENT

(71) Applicant: VMware, Inc., Palo Alto, CA (US)

(72) Inventor: Atanas D. Atanasov, Vratsa (BG)

(73) Assignee: VMware, Inc., Palo Alto, CA (US)

( * ) Notice: Subject to any disclaimer, the term of this patent is extended or adjusted under 35 U.S.C. 154(b) by 28 days.

(21) Appl. No.: 14/135,565

(22) Filed: Dec. 19, 2013

(65) Prior Publication Data

US 2015/0180824 A1 Jun. 25, 2015

(51) Int. Cl.
*H04L 29/12* (2006.01)
*H04L 61/5014* (2022.01)
(Continued)

(52) U.S. Cl.
CPC ...... *H04L 61/2015* (2013.01); *G06F 9/45558* (2013.01); *H04L 41/0856* (2013.01);
(Continued)

(58) Field of Classification Search
CPC . H04L 43/04; H04L 41/0856; H04L 61/6013; H04L 67/28; G06F 9/45558
(Continued)

(56) References Cited

U.S. PATENT DOCUMENTS 7,542,468 B1 6/2009 Begley et al.
7,818,452 B2 10/2010 Matthews et al.
(Continued)

FOREIGN PATENT DOCUMENTS

WO WO 2008/095010 8/2008

OTHER PUBLICATIONS

Author Unknown, "Enabling Service Chaining on Cisco Nexus 1000V Series," Month Unknown, 2012, 25 pages, CISCO.
(Continued)

*Primary Examiner* — Sibte H Bukhari (57) ABSTRACT

Some embodiments use proxies on host devices to capture broadcast DHCP traffic in a network. Each host in some embodiments executes one or more virtual machines (VMs). In some embodiments, a proxy operates on each host between each VM and the underlying network. For instance, in some embodiments, a VM's proxy operates between the VM and a physical forwarding element executing on the VM's host. To suppress DHCP broadcast, the proxy for a particular VM monitors the VM's traffic to detect and intercept a DHCP discover message. When the proxy receives a DHCP discover message, the proxy retrieves DHCP configuration data that was previously stored on the host for the VM. In some embodiments, the DHCP configuration data is stored on the host for the VM during the installation of the VM in response to an administrator's request or as part of an installation script that installs the VM. The DHCP configuration data in some embodiments is stored in one common data store for all the VMs that execute on the host, while in other embodiments, each VM's DHCP configuration data is stored in a DHCP data store that is uniquely maintained for the VM. In some of these latter embodiments, the data in the unique DHCP data store for a VM can easily migrate with the VM when the VM migrates from one host to another host.

20 Claims, 9 Drawing Sheets

(51) Int. Cl.
 *H04L 67/56* (2022.01)
 *H04L 61/59* (2022.01)
 *G06F 9/455* (2018.01)
 *H04L 41/0853* (2022.01)
 *H04L 41/04* (2022.01)

(52) U.S. Cl.
 CPC ........ *H04L 61/6013* (2013.01); *H04L 67/28* (2013.01); *G06F 2009/45595* (2013.01); *H04L 41/04* (2013.01)

(58) Field of Classification Search
 USPC ....................................................... 709/224
 See application file for complete search history.

(56) References Cited

U.S. PATENT DOCUMENTS

| | | | |
|---|---|---|---|
| 7,948,986 | B1 | 5/2011 | Ghosh et al. |
| 8,190,767 | B1 | 5/2012 | Maufer et al. |
| 2003/0093481 | A1 | 5/2003 | Mitchell et al. |
| 2005/0041671 | A1* | 2/2005 | Ikeda et al. ............ 370/395.52 |
| 2005/0080891 | A1 | 4/2005 | Cauthron |
| 2005/0251856 | A1 | 11/2005 | Araujo et al. |
| 2007/0061492 | A1 | 3/2007 | van Riel |
| 2007/0286209 | A1 | 12/2007 | Wang et al. |
| 2008/0028071 | A1* | 1/2008 | Miyajima ..................... 709/224 |
| 2008/0072305 | A1 | 3/2008 | Casado et al. |
| 2009/0083406 | A1* | 3/2009 | Harrington ............ G06F 15/16 709/222 |
| 2009/0129271 | A1 | 5/2009 | Ramankutty et al. |
| 2009/0235325 | A1 | 9/2009 | Dimitrakos et al. |
| 2010/0257263 | A1* | 10/2010 | Casado et al. ................ 709/223 |
| 2011/0022695 | A1 | 1/2011 | Dalal et al. |
| 2011/0246633 | A1* | 10/2011 | Khosravi ............ H04L 67/2819 709/223 |
| 2012/0084381 | A1* | 4/2012 | Alladi ..................... G06F 9/544 709/213 |
| 2012/0197973 | A1 | 8/2012 | Tukol et al. |
| 2013/0073743 | A1 | 3/2013 | Ramasamy et al. |
| 2013/0227550 | A1 | 8/2013 | Weinstein et al. |
| 2013/0332983 | A1 | 12/2013 | Koorevaar et al. |
| 2014/0064104 | A1* | 3/2014 | Nataraja ............... H04L 61/103 370/248 |
| 2014/0068602 | A1 | 3/2014 | Gember et al. |
| 2014/0115578 | A1 | 4/2014 | Cooper et al. |
| 2014/0195666 | A1 | 7/2014 | Dumitriu et al. |
| 2015/0043581 | A1* | 2/2015 | Devireddy ............. H04L 49/70 370/392 |

OTHER PUBLICATIONS

Dumitriu, Dan Mihai, et al. (U.S. Appl. No. 61/514,990), filed Aug. 4, 2011.

Guichard, J., et al., "Network Service Chaining Problem Statement," Network Working Group, Jun. 13, 2013, 14 pages, Cisco Systems, Inc.

Joseph, Dilip Antony, et al., "A Policy-aware Switching Layer for Date Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," 9$^{th}$ USENIX conference on Networked System Design and Implementation, Apr. 25-27, 2012, 14 pages.

Sherry, Justine, et al., "Making Middleboxes Someone Else's Problem: Network Processing as a Cloud Service," SSIGCOMM, Aug. 13-17, 2012, 12 pages, ACM, Helsinki, Finland.

* cited by examiner

METHODS, APPARATUSES AND SYSTEMS FOR ASSIGNING IP ADDRESSES IN A VIRTUALIZED ENVIRONMENT

BACKGROUND

To date, several solutions have been proposed for assigning IP (Internet Protocol) addresses to virtual machines executing on hosts. Like other devices, virtual machines require an IP address to access network resources. In virtualized environments, IP addresses are assigned usually by using a DHCP server, running agents in the VM (such as VM tools) or customizing the virtual machine at first use (such as Sysprep).

To obtain IP addresses, some VMs use dynamic host configuration protocol (DHCP), which broadcast DHCP messages to interact with DHCP servers in the network in order to obtain the desired IP addresses and other DHCP data. A broadcast packet usually consumes much more resources than a unicast packet as it is sent to many destinations. When the number of hosts becomes large, the broadcast traffic becomes prohibitively high.

Previous techniques for assigning IP addresses have several drawbacks. Customization (e.g., using Sysprep) is a one-time operation and the applied configuration cannot be changed at a subsequent boot of the VM. Also, it is not always desirable or possible to use an agent inside the VM. Using standalone DHCP servers requires running separate physical servers or VMs that perform the DHCP service. The VM and the DHCP server (or relays) must be connected to the same virtualized broadcast domain. When operating on a cloud-scale, running these DHCP services consumes resources (VMs, virtualized networks) and overhead for maintaining the distributed configuration of those servers. Accordingly, there is a need in the art to assign IP addresses and other DHCP configuration data without relying on guest agents or stand-alone DHCP servers.

BRIEF SUMMARY

Some embodiments use proxies on host devices to intercept broadcast DHCP traffic in a network, in order to assign IP addresses to virtual machines without broadcasting messages to DHCP servers. Each host in some embodiments executes one or more virtual machines (VMs). In some embodiments, a proxy operates on each host between each VM and the underlying network. For instance, in some embodiments, a VM's proxy operates between the VM and a physical forwarding element executing on the VM's host. In some embodiments, the physical forwarding elements are software forwarding elements that execute on the host devices to collectively implement different logical forwarding elements (e.g., logical switches, logical routers, etc.) for different logical networks of different tenants, users, departments, etc. that use the same shared computing and networking resources.

To capture DHCP broadcast messages, the proxy for a particular VM monitors the VM's traffic to detect and intercept a DHCP discover message. When the proxy receives a DHCP discover message, the proxy retrieves DHCP configuration data that was previously stored on the host for the VM. In some embodiments, the DHCP configuration data is stored on the host for the VM during the initiation of the VM (e.g., during the installation or during the boot-up of the VM) in response to an administrator's request or as part of an initiation script that initiates (e.g., installs or boots-up) the VM. The DHCP configuration data in some embodiments is stored in one common data store for all the VMs that execute on the host, while in other embodiments, each VM's DHCP configuration data is stored in a DHCP data store that is uniquely maintained for the VM. In some of these latter embodiments, the data in the unique DHCP data store for a VM can easily migrate with the VM when the VM migrates from one host to another host.

In some embodiments, the proxy retrieves the DHCP configuration data for a VM through an agent that (1) executes on the host device and (2) connects various proxies that execute on the host with one or more data stores that store DHCP configuration data for the VMs of the proxies. In these embodiments, the proxy converts the DHCP discover broadcast message to a unicast message to the agent, in order to direct the agent to obtain the DHCP configuration data. The agent then retrieves the requested DHCP configuration from the common or unique DHCP data store. The DHCP configuration data includes IP addresses and other DHCP configuration data in some embodiments of the invention. Also, in some embodiments, the IP address for a VM is a logical address that is assigned to the VM.

Upon receiving the requested DHCP configuration data (including the IP address) from the agent, the proxy formulates a DHCP offer message and supplies this message as a packet to the particular VM as if the packet was sent from the DHCP server. In some embodiments, the DHCP offer packet will be formatted in the same manner that a traditional DHCP server provides such packets. Accordingly, in some embodiments, the supplied DHCP offer message includes DHCP configuration data including the IP address.

After receiving the DHCP offer, the VM sends a DHCP request broadcast in some embodiments. The proxy intercepts this packet and in response, generates a DHCP acknowledge message and supplies this DHCP acknowledge message to the VM. The supplied DHCP acknowledge message is in the DHCP acknowledgment format that a DHCP server would use to send such an acknowledge message. In some embodiments, the DHCP acknowledgment message may include additional configuration information.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
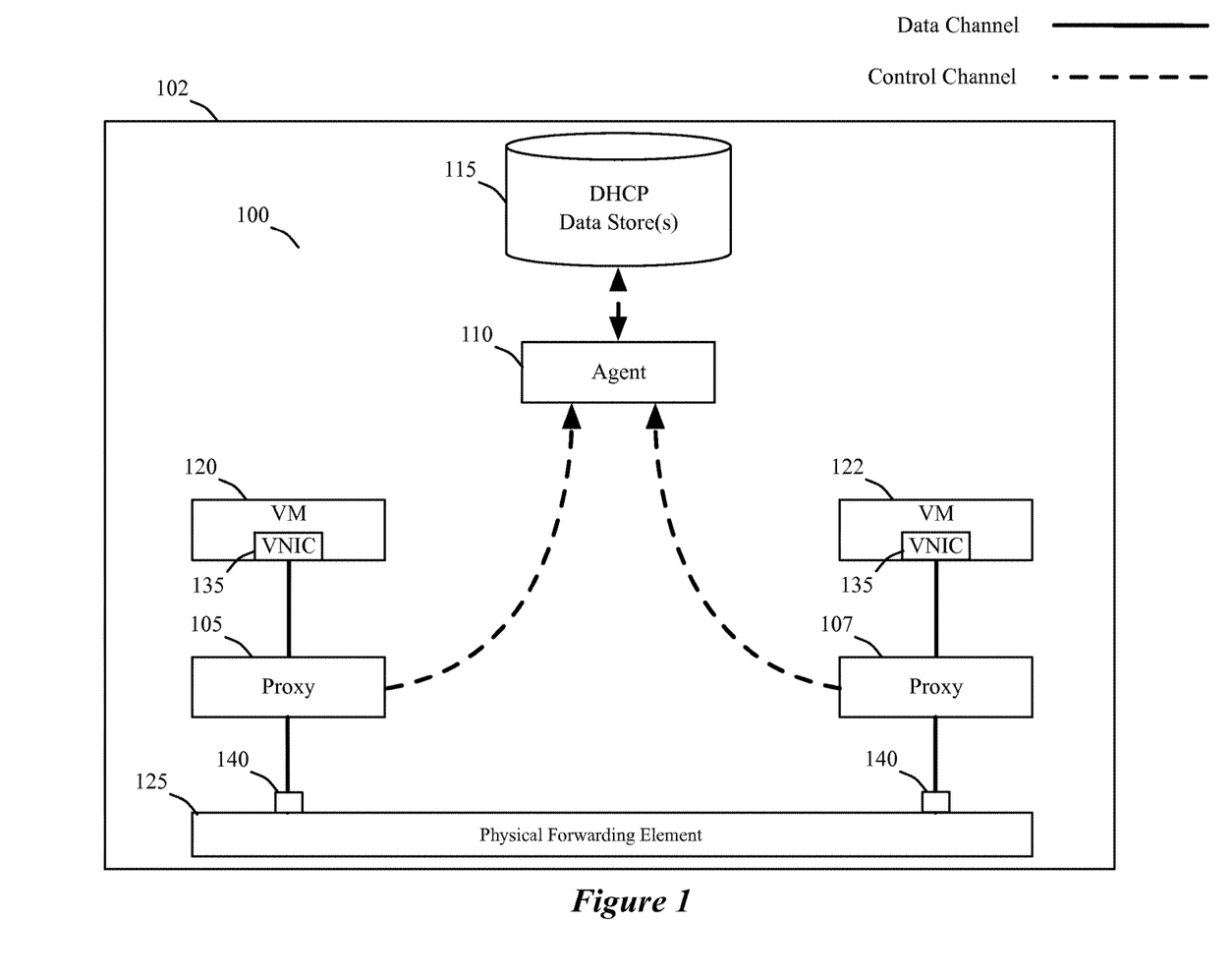
FIG. 1 illustrates a broadcast-capturing, proxy architecture of some embodiments.

Some embodiments use proxies on host devices to intercept broadcast DHCP traffic in a network. FIG. 1 illustrates a broadcast-capturing, proxy architecture 100 of some embodiments. Specifically, it shows a host device (e.g., a computer) 102 on which two VMs 120 and 122 and a physical forwarding element 125 (e.g., a software switch) execute. Each VM 120 and 122 on the host executes above a hypervisor that is running on the host. Also executing on this host are several other types of components, which include the proxies 105 and 107 and the agent 110. The proxies 105/107 and the agent 110 along with one or more DHCP data stores 115 deal with DHCP broadcast packets, as further described below.

As shown in FIG. 1, each proxy sits between a VNIC 135 of a VM and a port 140 of the physical forwarding element 125. In some embodiments, the physical forwarding element 125 is a layer 2 software switch that connects the VMs to a physical NIC (PNIC) of the host. The PNIC, in turn, connects the host to a network, such as a local area network, a wide area network, or a network of networks (such as the Internet). As such, the PFE and the PNIC are in the datapath between the VMs and any devices outside of the host that exchange packets with the VMs. In some embodiments, the PFE 125 of the host 102 implements different logical forwarding elements (e.g., logical switches, logical routers, etc.) with the PFEs of other hosts for different logical networks of different tenants, users, departments, etc. that use the same shared computing and networking resources. Such logical networks allow one set of VMs that execute on different hosts to be part of the same logical network, while allowing another set of VMs that execute on the same or overlapping group of hosts to be part of a different logical network. VXLAN provides one manner for creating different logical switches through shared physical software switches executing on different hosts. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

By sitting between the VNIC and the port of the PFE 125, the proxy can intercept DHCP broadcast packets sent by the VM, while allowing non-broadcast packets to pass through along the normal data path for packets. Specifically, when the proxy receives a packet that is not a DHCP broadcast packet, it passes this packet along the data path to its associated PFE, which then performs its forwarding operations on this packet to drop the packet, or to forward the packet to other physical forwarding elements or to the packet's destination. Alternatively, when the proxy receives a DHCP broadcast, it initiates a process to respond to this packet without sending out the broadcast packet to other hosts or VMs through the network.

In some embodiments, the proxy is inserted in the datapath between the VNIC and the port by including a function call to the proxy in the code that implements the VNIC or the port. For a packet, the proxy function can be called by the VNIC or the port so that the proxy function can ascertain whether the packet is a DHCP broadcast packet that it needs to resolve. The term "packet" is used here as well as throughout this document to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

To capture DHCP broadcast messages, the proxy for a particular VM monitors the VM's traffic to detect and intercept a DHCP discover message. When the proxy receives a DHCP discover message, the proxy 105 or 107 retrieves the DHCP configuration data for its VM through the agent 110, which executes on the host device and connects various proxies that execute on the host with one or more DHCP data store(s) 115 that store DHCP configuration data for the VMs of the proxies. In other words, the proxy handles DHCP broadcast messages by intercepting such messages in the datapath channel, and resolving them through out-of-band, control channel communication with the agent 110 and the data store(s) 115. In some embodiments, the agents execute in the user space, while the proxies execute in the kernel space. In some of these embodiments, the agents and proxies communicate through a type of socket (e.g., a vmklink of VMware) that establishes a communication control channel.

In some embodiments, the DHCP configuration data is stored on the host for the VM during the initiation of the VM (e.g., during the installation or during the boot-up of the VM) in response to an administrator's request or as part of an initiation script that initiates (e.g., installs or boots-up) the VM. The DHCP data store 115 in some embodiments is one common data store for all the VMs that execute on the host. In other embodiments, each VM has its own separate DHCP data store that is uniquely maintained for the VM. Maintaining a separate data store for a VM allows the DHCP configuration data to easily migrate with the VM when the VM migrates from one host to another host.

In these embodiments, the proxy converts the DHCP discover broadcast message that it intercepts to a unicast message to the agent, in order to direct the agent to obtain the DHCP configuration data. The agent retrieves the requested DHCP configuration from the common or unique DHCP data store. The DHCP configuration data includes IP addresses and other DHCP configuration data in some embodiments of the invention. Also, in some embodiments, the IP address for a VM is a logical address that is assigned to the VM.

Upon receiving the requested DHCP configuration data (including the IP address) from the agent, the proxy formulates a DHCP offer message and supplies this message as a packet to the particular VM as if the packet was sent from the DHCP server. In some embodiments, the DHCP offer packet will be formatted in the same manner that a traditional DHCP server provides such packets. Accordingly, in some embodiments, the supplied DHCP offer message includes DHCP configuration data including the IP address.

After receiving the DHCP offer, the VM sends a DHCP request broadcast in some embodiments. The proxy intercepts this packet and in response, generates a DHCP acknowledge message and supplies this DHCP acknowledge message to the VM. The supplied DHCP acknowledge message is in the DHCP acknowledgment format that a DHCP server would use to send such an acknowledge message. In some embodiments, the DHCP acknowledgment message may include additional configuration information.

Figure 2:
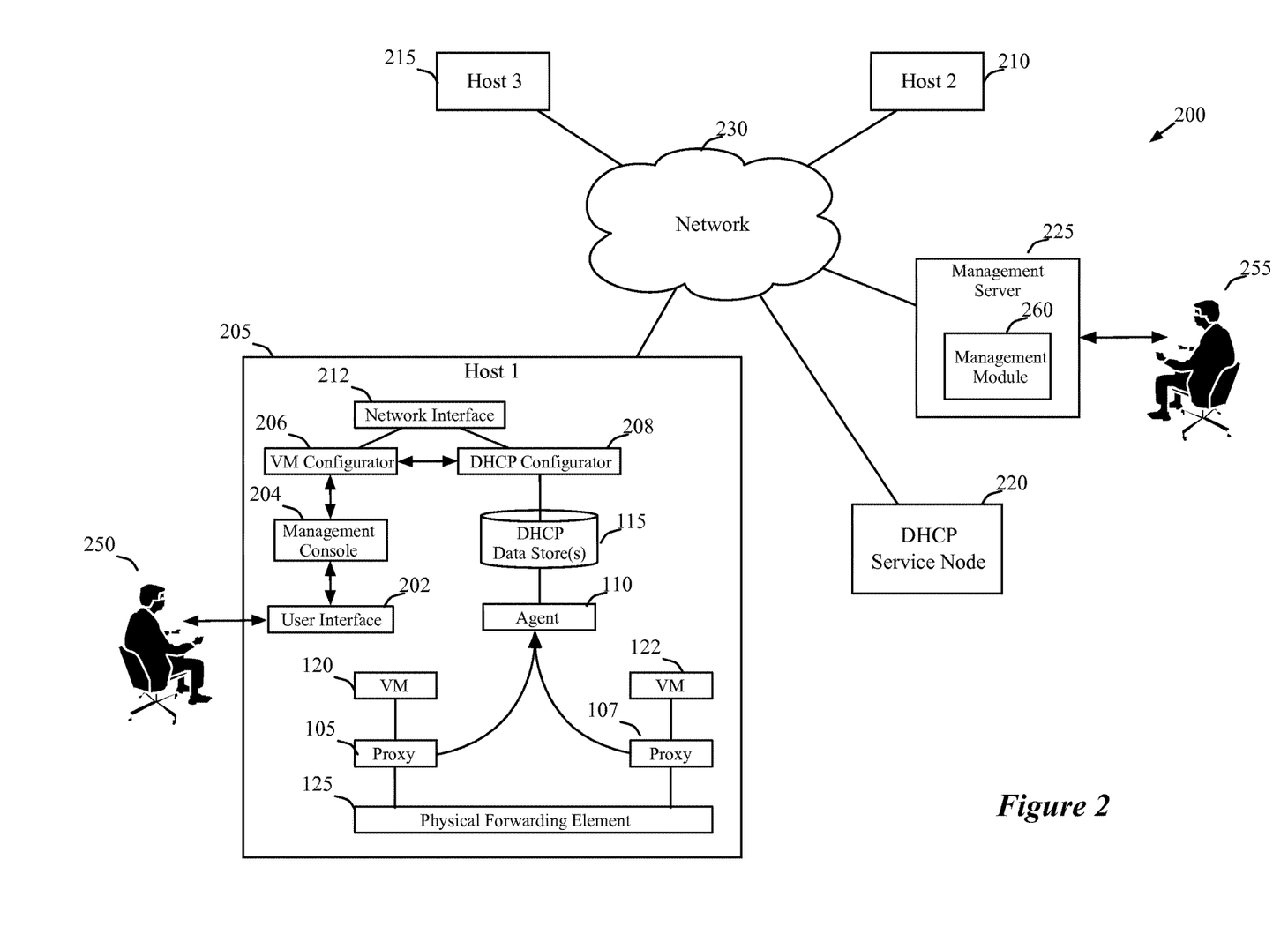
FIGS. 2 and 3 illustrate environments in which the broadcast-capturing, proxy architecture of some embodiments is implemented.

FIG. 2 illustrates how the DHCP data store is configured in some embodiments. Specifically, FIG. 2 illustrates an example of an environment in which the broadcast-capturing, proxy architecture of some embodiments is implemented. This environment 200 includes three hosts 205, 210, and 215, a DHCP service node 220, a server management console 225, and a network 230 through which all of these components interact. FIG. 2 also illustrates several components for host 205. These components include the VMs 120/122, proxies 105/107, PFE 125, agent 110 and data store(s) 115 of FIG. 1, plus a user interface module 202, a management console 204, a VM configurator 206, a DHCP configurator 208, and a network interface 212. In some embodiments, the other hosts 210 and 215 have components similar to those shown in FIG. 2 for host 205.

The DHCP configurator 208 stores DHCP configuration data for a VM in the DHCP data stores(s) 115 during the initiation (e.g., installation or boot-up) of the VM on the host 205. Specifically, the VM configurator 206 can be directed by a user to initiate a VM on the host 205, and during this initiation the VM configurator 206 is directed the DHCP configurator 208 to obtain and store DHCP configuration data for the VM, in some embodiments.

In some embodiments, a user 250 working on the host 205 can direct the VM configurator 206 to install the VM through the user interface 202 and the management console 204 of the host. Alternatively, or conjunctively, in some embodiments, a user 255 working on the remote management computer 225 that executes a remote management console 204 can direct the VM configurator 206 to install the VM through the network interface 212, the network 230, and the remote management module 260. The network interface 212 is a web interface (e.g., a web server interface) in some embodiments.

In some embodiments, the user 250 or 255 directs the host through some or all of the installation operations needed for installing the VM. In other embodiments, the user 250 or 255 initiates an installation script, which then guides the VM configurator through many or all of the installation operations. In some embodiments, one of the installation operations that the VM configurator 206 performs is to direct the DHCP configurator 208 to obtain DHCP configuration data for the VM that is being installed.

When initiated, the DHCP configurator 208 requests DHCP configuration data from the DHCP service node 220 through the network 230 and the network interface 212. Different embodiments use different DHCP service nodes. In some embodiments, the DHCP service node is a server-based tool that can be used by the DHCP configurator (e.g., at the behest of the VM configurator 206) to obtain DHCP configuration data for a VM. The user 250 or 255 in other embodiments can directly instruct (without going through the VM configurator) the DHCP configurator to obtain DHCP configuration data for the VM. In still other embodiments, the user 250 or 255 obtains the DHCP configuration data from the DHCP service node and supplies this data to the DHCP configuration. Once the DHCP configurator obtains the DHCP configuration data from the DHCP service node 220 or from the user, it stores this data in the DHCP data store(s) 215, so that the agent can subsequently provide this information to the proxy when the proxy detects a DHCP discover message from the newly installed VM.

Figure 3:
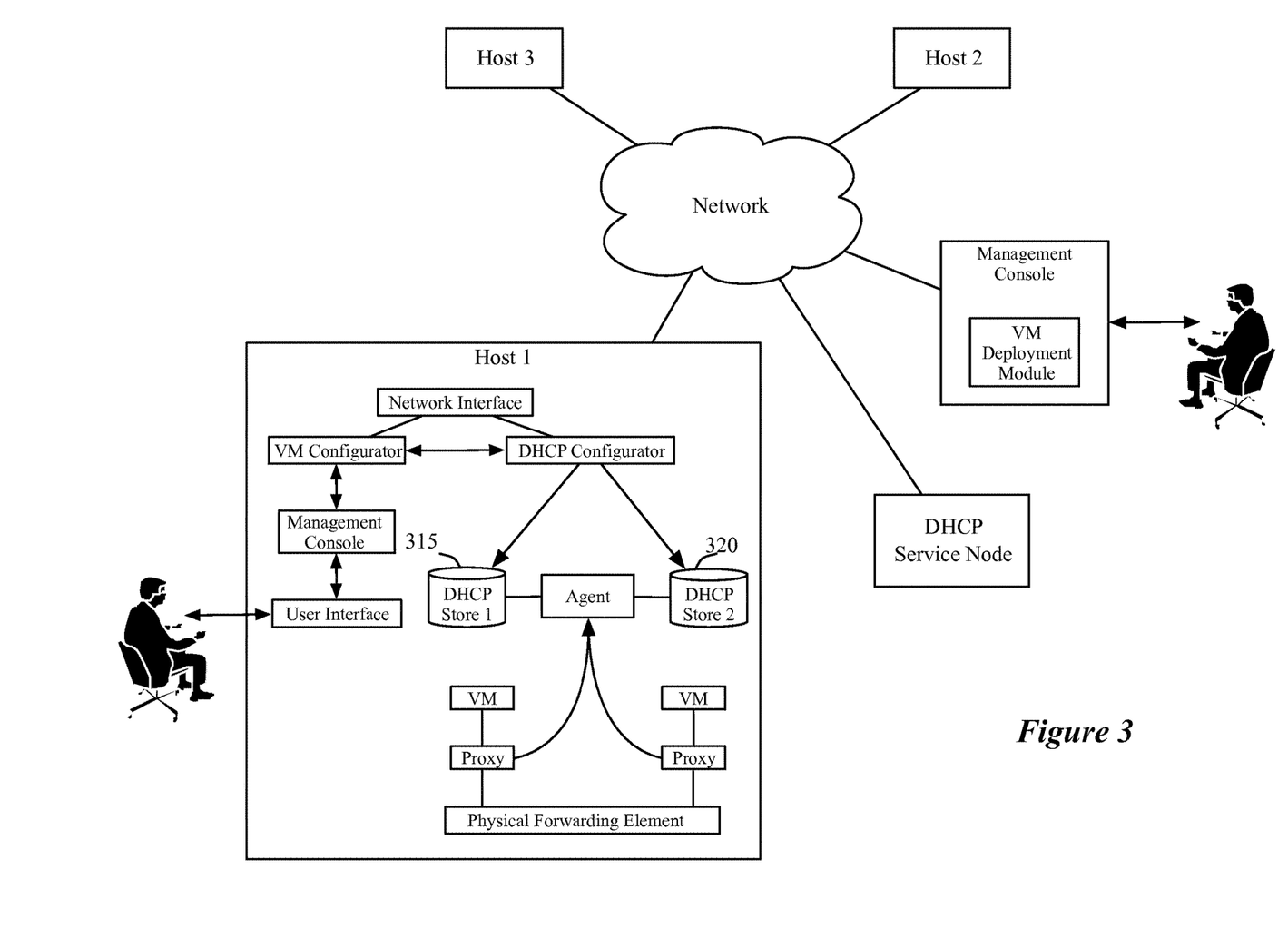

In the example illustrated in FIG. 2, one DHCP data store 115 can be used for all VMs executing on the host, or multiple DHCP data stores 115 can be used for multiple VMs, with each VM having its own unique data store. To illustrate this point further, FIG. 3 illustrates another example of an environment in which the broadcast-capturing, proxy architecture of some embodiments is implemented. This environment 300 is identical to the environment 200 of FIG. 2 except that FIG. 3 specifically illustrates two different data stores 315 and 320 for the two VMs 120 and 122. In some embodiments, each VM's data store also contains other information about the VM or is stored in the same memory hierarchy as the other VM specific data, so that the DHCP configuration data for the VM can be easily migrated with the rest of the VM's data when the VM migrates from host 205 to another host 210 or 215. Common VM migration tools (such as vMotion of VMware Inc.) are used in some embodiments to migrate the VM data, including its stored DHCP configuration data, from one host to another host.

Figure 4:
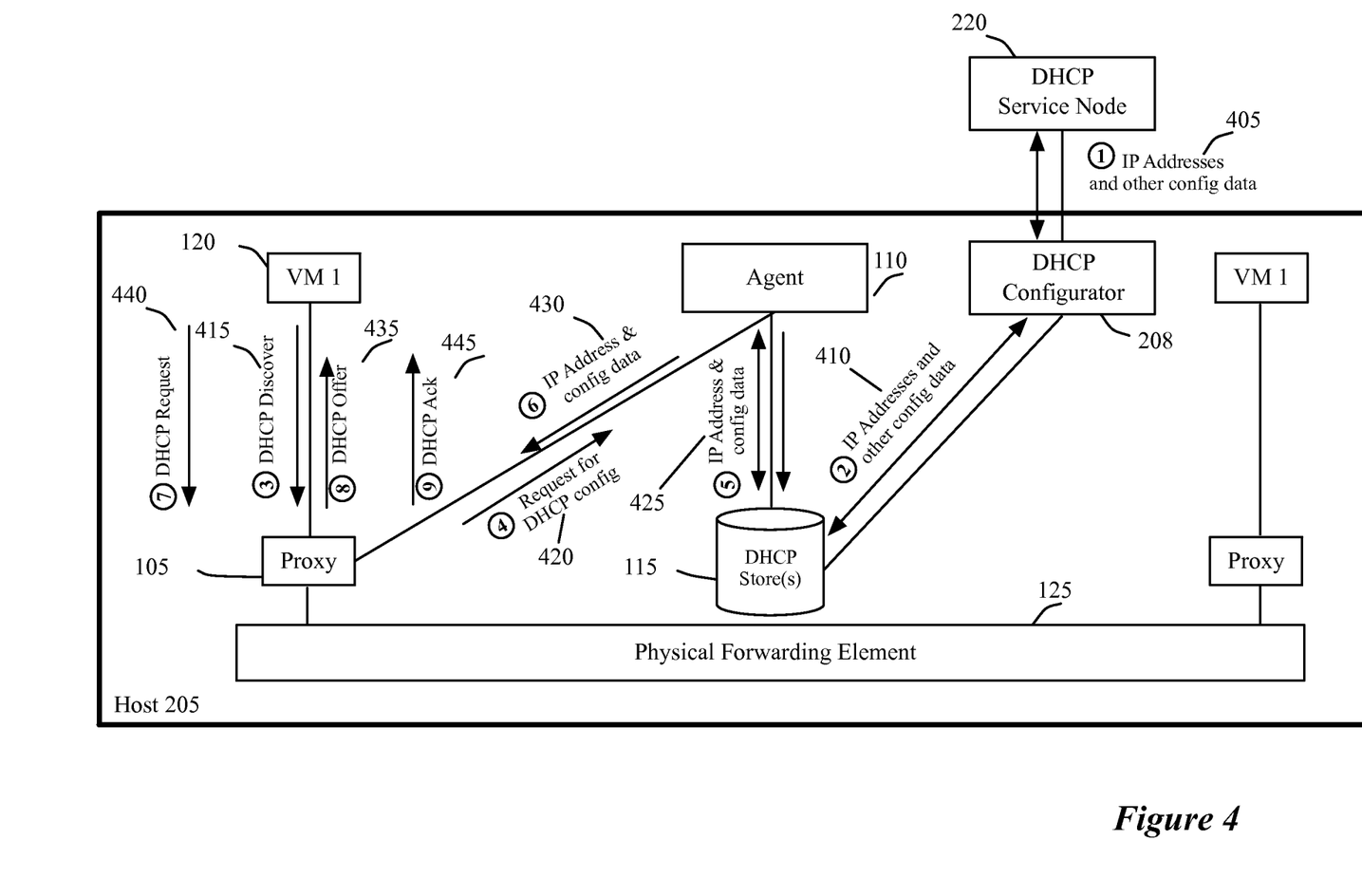
FIG. 4 illustrates the data flow for handling a DHCP broadcast message in some embodiments.

FIG. 4 presents a data flow diagram that illustrates the DHCP configurator storing the DHCP configuration data, and the proxy and the agent retrieving the DHCP configuration data to resolve a DHCP broadcast message. The first interaction shown in this figure is an exchange 405 of messages between the DHCP service node 220 and the DHCP configurator 208 that results in the DHCP configurator 208 obtaining the DHCP configuration data for a particular VM from the DHCP service node (also called DHCP provider below). As mentioned above, this exchange is initiated by the DHCP configurator 208 during the initiation of the VM. In some embodiments, the data is exchanged between the DHCP configurator and the DHCP provider along a secure channel (e.g., encrypted, authenticated channel). Also, in some embodiments, the DHCP provider assigns the DHCP configuration data (including the IP addresses) in a way that guarantees that the IP address allocations to the different VMs do not conflict.

After obtaining the DHCP configuration data for the particular VM, the DHCP configurator 208 sends a message 410 to the data store(s) 115 to store the DHCP configuration data for the particular VM. Once the DHCP configuration data is stored in the data store, it can later be used by the agent 110 and the proxy 105 to process a DHCP broadcast message. In some embodiments, the agent 110 maintains and accesses the DHCP data store 115 instead of the proxies, in order to provide a layer of security to segregate the data of one logical network from other logical networks. This approach prevents a proxy of a VM within one logical network from accessing the data of another logical network.

Messages 415-445 in FIG. 4 illustrate the processing of a DHCP broadcast message. As shown in FIG. 4, the DHCP broadcast process starts when the proxy 105 receives a DHCP discover message 415 from its VM 120. This message is a broadcast message to any DHCP server on the network (e.g., the logical network that contains the VM) for DHCP configuration information, including an IP address and any other information that is part of the DHCP set up. In some embodiments, the requested information (including the IP address) is information that will allow the VM 120 of host 205 to operate with other VMs in a logical network that is defined by the PFEs that execute on the various hosts. In some embodiments, the DHCP configuration data is defined in the address space that is set aside for the logical network to which VM 120 of host 205 belongs.

After receiving the message, the proxy 105 determines whether the message is a DHCP discover broadcast message. If not, the proxy sends the packet along the regular data path to the PFE 125 of the host or allows another process that has called the proxy to send this packet along the regular data path to the PFE. On the other hand, when the proxy determines that the received packet is DHCP discover broadcast, the proxy generates a message 420 to the agent 110 to request the DHCP configuration for its VM. In this manner, the proxy 105 converts the DHCP discover broadcast that is intended for all DHCP servers on the network to a unicast message to the agent 110. In some embodiments, this request message has a different format than the DHCP discover packet received from the VM. For instance, instead of being a DHCP request that is addressed to any DHCP server, it is a specific request message to the agent that is sent along the dedicated control channel socket between the proxy and the agent, in some embodiments.

In response to the request from the proxy, the agent 110 queries 425 the DHCP data store(s) 115 to retrieve a set of DHCP configuration data. The retrieved set of configuration data includes an IP address for the VM 120 in some embodiments. After retrieving this data, the agent sends the retrieved DHCP configuration data in a message 430 to the proxy 105. In some embodiments, this reply is through the socket connection between the proxy and agent.

When the proxy 105 receives the agent's reply with the requested IP address, the proxy then (1) formulates a DHCP offer packet 435 with the received IP address and other DHCP configuration data, and (2) supplies the DHCP offer 435 to the VM 120. The DHCP offer is formatted as if it was sent from a DHCP server (i.e., in a format that a traditional DHCP server provides such packets).

After receiving the DHCP offer, VM 120 sends a DHCP request broadcast 440. The proxy intercepts this packet and in response, the proxy generates a DHCP acknowledge message 445 and supplies this DHCP acknowledge message to the VM 120. The supplied DHCP acknowledge message is in a DHCP acknowledgment format that a DHCP server would use to send such an acknowledge message.

In some embodiments, the DHCP acknowledgment message may include additional configuration information. In some of these embodiments, the proxy receives this additional information in the agent's message 430, but waits until it sends the DHCP acknowledgement message to provide this additional information to the VM. However, in other embodiments, because of the need to obtain this additional configuration information, the proxy 105 interacts with the agent 110 (i.e., has the agent retrieve this additional information from storage 115) to formulate a DHCP acknowledgment in response to a DHCP request message from the VM.

Figure 5:
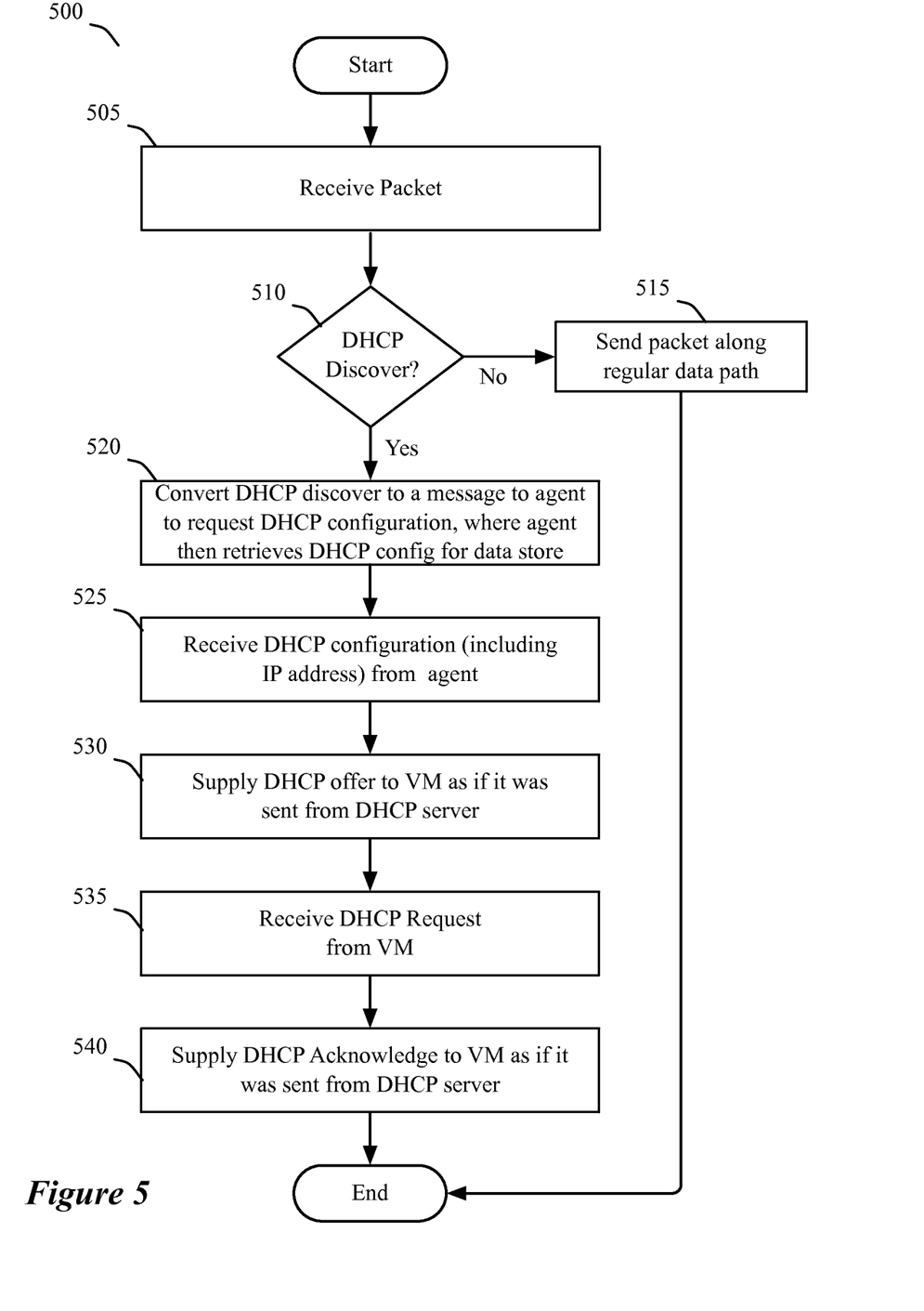
FIG. 5 conceptually illustrates a process that the proxy performs to handle a DHCP discover.

The operation of the proxies during a DHCP discover broadcast will now be described by reference to FIG. 5. This figure conceptually illustrates a process 500 that the proxy performs to handle a DHCP discover. As shown in FIG. 5, the process 500 starts (at 505) when the proxy 105 receives a packet from its VM 120. After receiving the packet (at 505), the process 500 determines (at 510) whether the packet is a DHCP broadcast message. If the packet is not a DHCP broadcast message, the process (at 515) sends the packet along the regular data path to the PFE 125 of the host or allows another process that has called the process 500 to send this packet along the regular data path to the PFE. After 515, the process ends.

On the other hand, when the process determines (at 510) that the received packet is a DHCP broadcast message, the process generates (at 520) a unicast, control channel message to its agent 110 to request the DHCP configuration for its VM. The agent, in turn, retrieves DHCP configuration data from the DHCP data store(s) 115 for the requesting proxy's VM. The proxy then receives (at 525) from the agent a reply that contains the received DHCP configuration. In some embodiments, the exchange between the proxy and the agent is through a socket connection between the proxy and the agent as described above.

After receiving the DHCP configuration at 525, the proxy formulates and supplies (at 530) a DHCP offer packet to the VM. The DHCP offer packet will be formatted in the same manner that a traditional DHCP server provides such packets. Traditionally, a device that receives a DHCP offer, sends a DHCP request message to accept the offer. When multiple DHCP servers exist in the network, the DHCP request message serves to notify the servers about which server is selected and which server or servers are not selected. The DHCP request message is accordingly a message to let the DHCP servers know which server was selected.

Accordingly, after receiving the DHCP offer, VM 120 of host 205 sends a DHCP request broadcast. The proxy intercepts this packet at 535. In response, at 540, the proxy generates a DHCP acknowledge message and supplies this DHCP acknowledge message to the VM. The supplied DHCP acknowledge message is in the DHCP acknowledgment format that a DHCP server would use to send such an acknowledge message. After 540, the process ends.

In some embodiments, the DHCP acknowledgment message may include additional configuration information. In some of these embodiments, the proxy receives this additional information from the agent when it received the message 430. However, in these embodiments, the proxy waits until it sends the DHCP acknowledgement message to provide this additional information to the VM. In other embodiments, to obtain this additional configuration information, the proxy interacts with the agent (i.e., sends a message to the agent, has the agent retrieve this data from the data store, and then receives the agent's reply) to formulate a DHCP acknowledgment in response to a DHCP request message from the VM.

Figure 6:
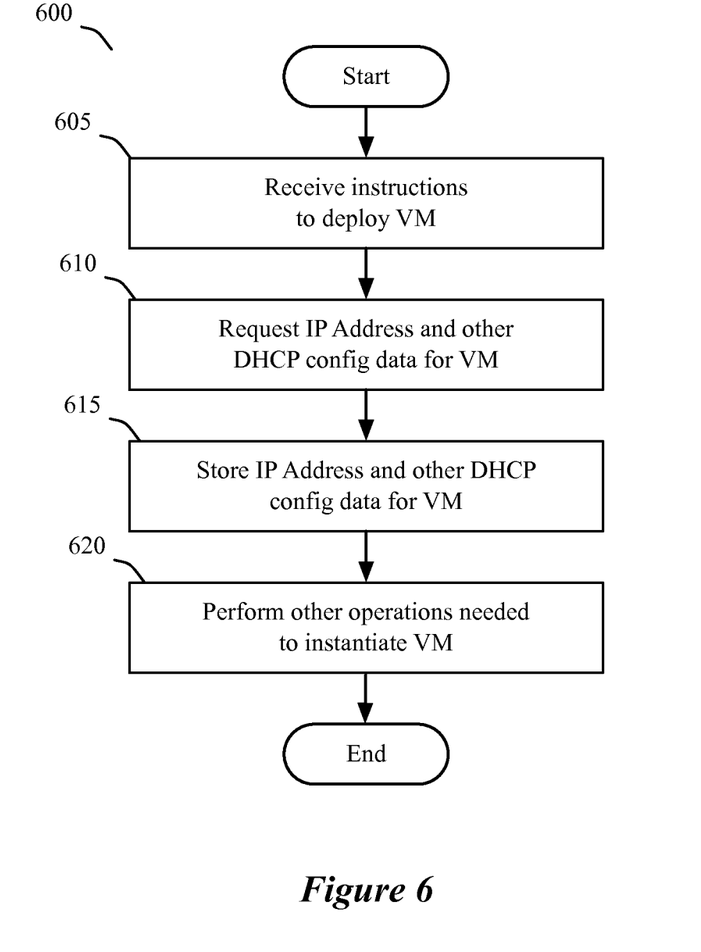
FIG. 6 conceptually illustrates a process for storing, on a host, DHCP configuration data for a VM that is being installed on the host.

FIG. 6 conceptually illustrates a process 600 that, for a VM that is being installed (i.e., is being provisioned) on a host, stores DHCP configuration data on the host. This process is performed by a VM configurator 206 of FIG. 2 or 3 in some embodiments. The process 600 initially receives (at 605) instructions to deploy the VM on the host. The process then requests (at 610) an IP address and other DHCP configuration data for the VM. In some embodiment, the process requests this data from the DHCP configurator 208, which, in turn, obtains this data from the DHCP service node 220, as described above. In other embodiments, the process 600 asks an administrator that initiated the process 600 for this information.

At 615, the process receives the requested IP address and other DHCP information and stores this information in a data store 115 for later access by the agent 110. As mentioned above, the agent accesses the data store 115 to retrieve the stored DHCP data (including the IP address) at a later time when the VM's proxy intercepts a DHCP discover broadcast from the VM. After storing the received DHCP configuration data at 615, the process 600 performs other operations needed to install the VM on the host. One of ordinary skill will realize that the order of the operations 610-620 could be different in different embodiments. For instance, in some embodiments, the process 600 requests and receives DHCP configuration data after it has performed one or more other operations needed for installing the VM on the host.

Figure 7:
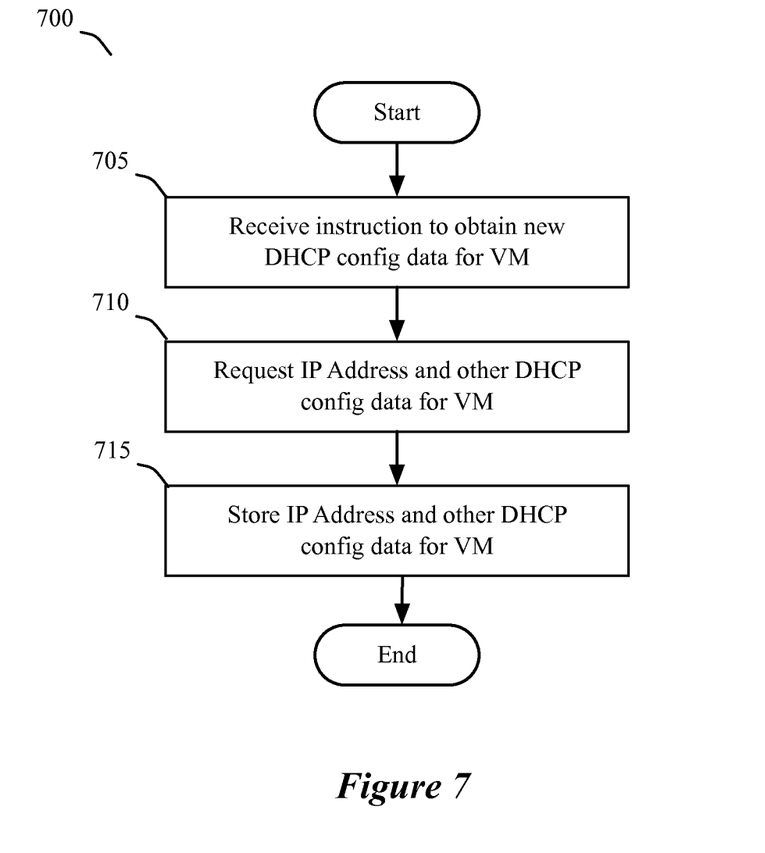
FIG. 7 conceptually illustrates a process for renewing the DHCP configuration data that is stored on a host for a VM.

FIG. 7 conceptually illustrates a process for renewing the DHCP configuration data that is stored on a host for a VM. This process is performed periodically in some embodiments, or intermittently at the behest of a user or a script (e.g., a script that is performed by the VM configurator 206) in other embodiments. Some embodiments perform this process to ensure that a new IP address is available for a VM during a current or subsequent boot-up (i.e., power up) of the VM. In some embodiments, the process 700 is performed by the DHCP configurator 208.

The process 700 initially receives (at 705) an instruction to obtain new DHCP configuration data for a previously installed VM. It then requests (at 710) a new IP address, and in some cases other new DHCP configuration data, for the VM. In some embodiment, the process requests this data from the DHCP service node 220. At 615, the process receives the requested new IP address, and in some cases, other new DHCP information. At 615, the process stores the new DHCP information (including the IP address) that it receives in a data store 115. The agent 110 later will access the data store 115 to retrieve the newly stored DHCP data (including the IP address) at a later time when the VM's proxy intercepts a DHCP renewal packet from the VM. The agent supplies the new DHCP data to the proxy, which, in turn, formulates a response to the DHCP renewal request and provides this response to the VM, so that the VM can use the newly supplied IP address and any other new DHCP data. Examples of new DHCP data include DNS server addresses, default gateway addresses, time server addresses, etc.

In the embodiments illustrated in FIGS. 6 and 7, the DHCP configuration data is obtained during the installation of the VM, and is then renewed during various other phases of the VM's operations (e.g., during the boot-up of the VM). Other embodiments, however, obtain the DHCP configuration data differently. For instance, some embodiments perform the operations of FIG. 6 each time the VM boots-up, instead of just performing this operation during the VM's installation (i.e., during the VM's provisioning).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
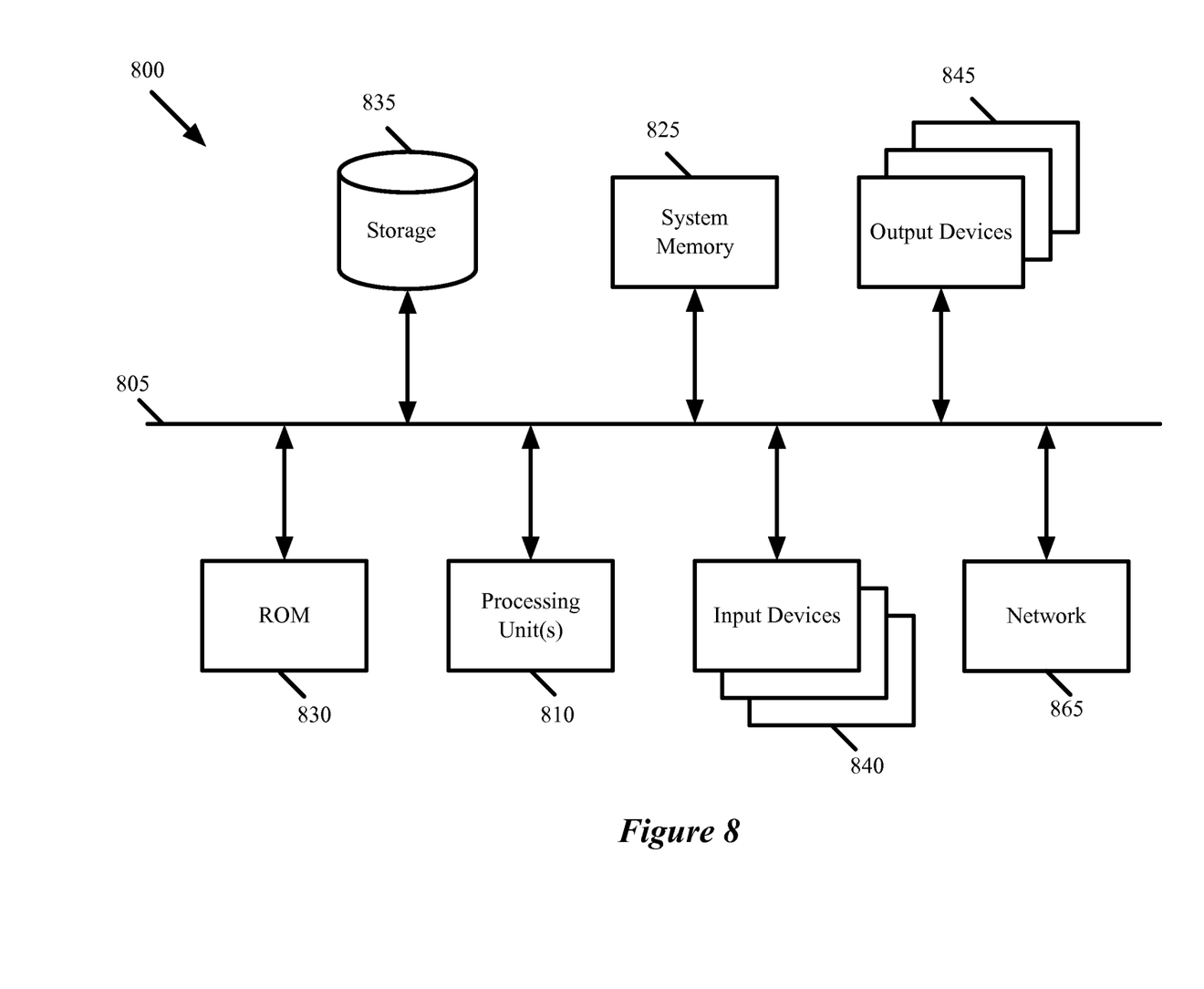
FIG. 8 illustrates an electronic system that is used by in some embodiments to implement a host or other computing devices illustrated in the other figures of this document.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5-7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In several figures described above, several embodiments are described for capturing broadcast messages in computing and networking environments that include virtual machines and logical networks. However, one of ordinary skill will realize that the some embodiments are used in traditional physical networks with large numbers of computers or with numerous VMs executing on numerous hosts, in order to reduce broadcast message in these more traditional environments.

Figure 9:
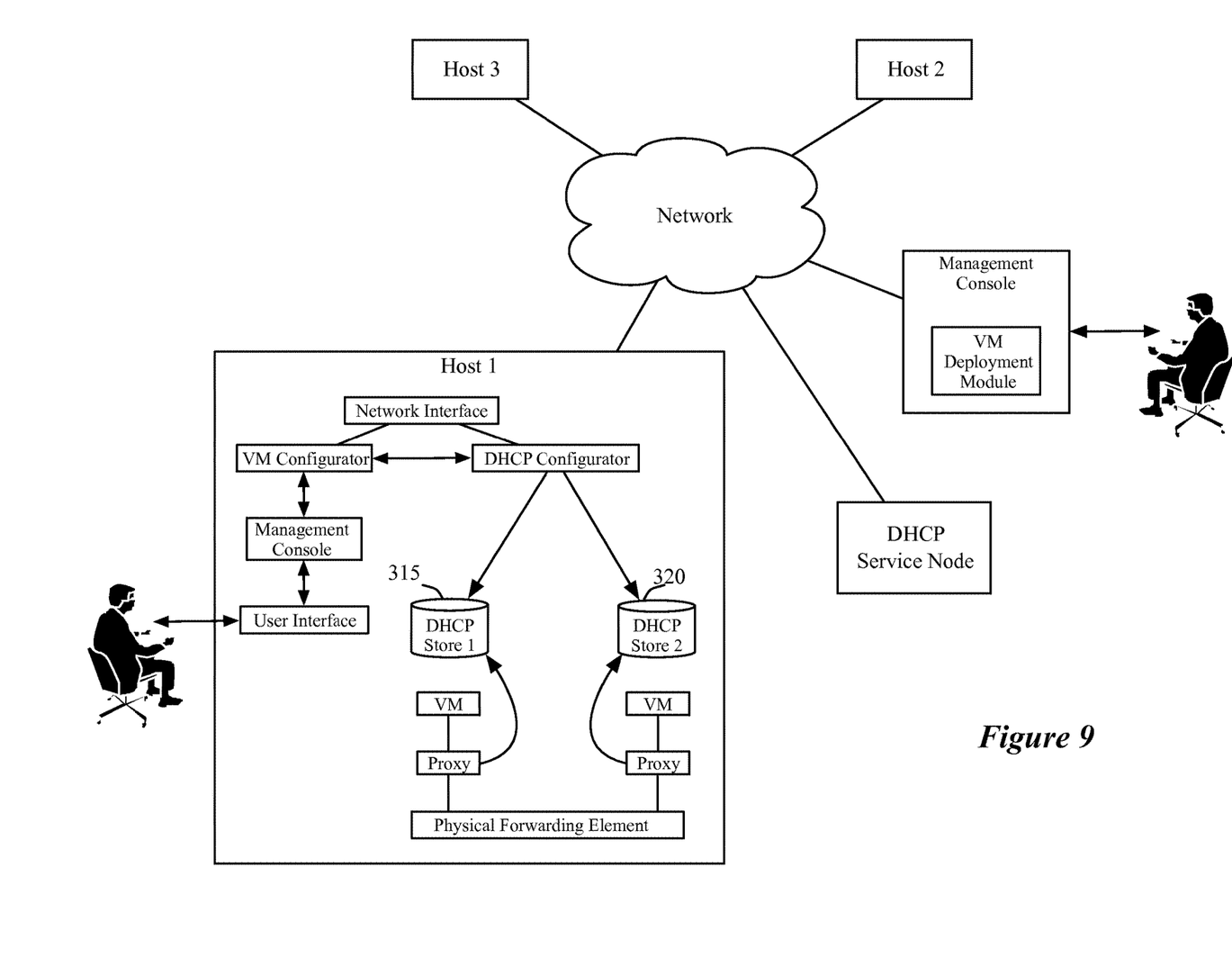
FIG. 9 illustrates an alternative broadcast-capturing, proxy architecture of some embodiments.

Also, in several embodiments described above, the broadcast capture and suppression method uses an agent 110 as an intermediary between the broadcast-intercepting proxies and the data store (e.g., data store 615, 315, and 320). However, as shown in FIG. 9, the proxies in some embodiments might directly query the data stores. In the example illustrated in this figure, the proxies are directly querying the DHCP data stores 315 and 320, which, as described above by reference to FIG. 3, store the DHCP configuration data for their associated VMs. By directly accessing the DHCP data stores 315 and 320, the proxies perform the following three operations (1) intercepting DHCP broadcast messages from their VM, (2) querying the DHCP data store of their VM to retrieve previously stored DHCP configuration data for their VM, and (3) formulating the DHCP configuration data in one or more DHCP reply messages that they supply to their corresponding VM to resolve the DHCP broadcast messages.

In view of the foregoing, one of ordinary skill in the art would understand that the invention is not to be limited by the foregoing illustrative details, but rather is to be defined by the appended claims.

I claim:

1. A method for providing an Internet Protocol (IP) address to a virtual machine (VM) without sending a request for an IP address assignment to a dynamic host configuration protocol (DHCP) server, the method comprising:
   during initiation of a particular VM on a host device, assigning the IP address to the particular VM and storing the assigned IP address in a data store;
   intercepting, by a proxy module residing on the host device, a DHCP discover message from the particular VM, the DHCP discover message being directed to one or more DHCP servers;
   converting, by the proxy module, the DHCP discover message to a unicast message, the proxy module sending the unicast message to an agent without broadcasting the DHCP discover message to any DHCP server, the unicast message directing the agent to obtain the assigned IP address;
   based on the sent message, the proxy module receiving the assigned IP address stored in the data store from the agent; and
   supplying the assigned IP address stored in the data store to the particular VM in a packet without relying on any server outside the host device to provide the assigned IP address.

2. The method of claim 1, wherein a reply to the DHCP discover message comprises:
   a DHCP offer with at least part of DHCP configuration data; and
   a DHCP acknowledge that is supplied to the particular VM in response to a DHCP request message received from the particular VM.

3. The method of claim 1, wherein the packet is formatted as if it came from the one or more DHCP servers.

4. The method of claim 1, wherein communication between the proxy module and the agent is a control channel communication that is an out-of-band control channel connection established between the agent and the proxy module.

5. The method of claim 4, wherein the agent connects a plurality of proxy modules executing on the host device to the data store.

6. The method of claim 1, wherein
the host device comprises at least one physical forwarding element (PFE);
the at least one PFE of the host device implements a plurality of logical forwarding elements (LFEs);
wherein DHCP configuration data is data that defines network attributes in one of the LFEs.

7. The method of claim 4 further comprising, at the agent, exchanging messages with a computer outside of the host device to obtain updated configuration data to provide for the VM.

8. The method of claim 1, wherein the initiation of the particular VM comprises installation of the VM on the host device.

9. The method of claim 1, wherein the initiation of the particular VM comprises booting-up of the VM on the host device.

10. A non-transitory machine readable medium storing a program for providing an Internet Protocol (IP) address to a virtual machine (VM) without sending a request for an IP address assignment to a dynamic host configuration protocol (DHCP) server, the program comprising a set of instructions for:
during initiation of a particular VM on a host device of a plurality of host devices, assigning an IP address to the particular VM and storing the assigned IP address in a data store;
intercepting, by a proxy module residing on the host device, a DHCP discover message from the particular VM, the DHCP discover message being directed to one or more DHCP servers;
converting, by the proxy module, the DHCP discover message to a unicast message, the proxy module sending the unicast message to an agent without broadcasting the DHCP discover message to any DHCP server, the unicast message directing the agent to obtain the assigned IP address;
based on the sent message, the proxy module receiving the assigned IP address stored in the data store from the agent; and
supplying the assigned IP address stored in the data store to the particular VM in a packet, without relying on any server outside the host device to provide the assigned IP address.

11. The machine readable medium of claim 10, wherein supplying the assigned IP address stored in the data store comprises providing DHCP configuration data.

12. The machine readable medium of claim 11, wherein a reply to the DHCP discover message comprises:
a DHCP offer with at least part of the DHCP configuration data; and
a DHCP acknowledge that is supplied to the particular VM in response to a DHCP request message received from the particular VM.

13. The machine readable medium of claim 12, wherein the DHCP acknowledge includes additional DCHP configuration data.

14. The machine readable medium of claim 10, wherein communication between the proxy module and the agent is a control channel communication that is an out-of-band control channel connection established between the agent and the proxy module.

15. The machine readable medium of claim 14, wherein the agent connects a plurality of proxy modules executing on the host device to the data store.

16. The machine readable medium of claim 11, wherein
each of the plurality of host devices comprises at least one physical forwarding element (PFE);
the PFEs of the plurality of host devices collectively implement a plurality of logical forwarding elements (LFEs);
wherein DHCP configuration data is data that defines network attributes in one of the LFEs.

17. The machine readable medium of claim 15, wherein the program further comprises a set of instructions for, at the agent, exchanging messages with a computer outside of the host device to obtain updated configuration data to provide for the VM.

18. The machine readable medium of claim 11, wherein the initiation of the particular VM comprises installation of the VM on the host device.

19. A system for providing an Internet Protocol (IP) address to a virtual machine (VM) without sending a request for an IP address assignment to a dynamic host configuration protocol (DHCP) server, the system comprising:
a data store;
a proxy;
a virtual machine; and
a processor programmed to:
during initiation of the VM on a host device, assigning an IP address to the VM and storing the assigned IP address in the data store;
intercepting, by the proxy residing on the host device, a DHCP discover message from the VM, the DHCP discover message being directed to one or more DHCP servers;
converting, by the proxy, the DHCP discover message to a unicast message, the proxy sending the unicast message to an agent without broadcasting the DHCP discover message to any DHCP server, the unicast message directing the agent to obtain the assigned IP address;
based on the sent message, the proxy receiving the assigned IP address stored in the data store from the agent; and
supplying the assigned IP address stored in the data store to the VM in a packet, without relying on any server outside the host device to provide the assigned IP address.

20. The system of claim 19, wherein the initiation of the VM comprises installation of the VM on the host device.

* * * * *